United States Patent [19]

Hessert

[11] 4,040,484

[45] Aug. 9, 1977

[54] GEL FORMATION BY POLYMER CROSSLINKING

[75] Inventor: James E. Hessert, Bartlesville, Okla.

[73] Assignee: Phillips Petroleum Company, Bartlesville, Okla.

[21] Appl. No.: 629,360

[22] Filed: Nov. 6, 1975

[51] Int. Cl.² .......................................... E21B 33/138
[52] U.S. Cl. .................................. 166/294; 106/194; 106/208; 166/270; 166/295; 252/316; 260/29.6 H; 260/DIG. 14
[58] Field of Search ...................... 252/8.55 R, 8.55 D, 252/316; 166/294, 295, 283, 270; 260/DIG. 14, 29.6 H; 106/194

[56] References Cited

U.S. PATENT DOCUMENTS

| | | | |
|---|---|---|---|
| 3,301,723 | 1/1967 | Chrisp | 252/316 X |
| 3,502,149 | 3/1970 | Pence | 166/295 |
| 3,554,287 | 1/1971 | Eilers | 252/8.55 X |
| 3,727,687 | 4/1973 | Clampitt et al. | 166/294 X |
| 3,749,172 | 7/1973 | Hessert et al. | 166/294 |
| 3,785,437 | 1/1974 | Clampitt et al. | 166/295 X |
| 3,908,760 | 9/1975 | Clampitt et al. | 166/294 X |
| 3,921,733 | 11/1975 | Clampitt | 166/294 X |
| 3,926,258 | 12/1975 | Hessert et al. | 166/294 |

*Primary Examiner*—Herbert B. Guynn

[57] ABSTRACT

A composition of matter comprising water, a polymer capable of being crosslinked by polyvalent metal cations, a reducible species containing said polyvalent metal in a higher oxidation state, and a reducing agent selected from among KI, $MnCl_2$, $Mn(NO_3)_2$, and $K_4Fe(CN)_6$ which composition is capable of forming a gel by crosslinking is provided. A method is also provided for in situ gel formation using this crosslinking composition. In one of its embodiments a method is provided for increasing the rate of gel formation by the addition of H+ ion.

10 Claims, No Drawings

GEL FORMATION BY POLYMER CROSSLINKING

BACKGROUND OF THE INVENTION

This invention relates to compositions of matter that will form gels by polymer crosslinking. In one of its aspects this invention relates to the forming of gels by polymer crosslinking. In another of its aspects this invention relates to the formation of gels by a slow rate of polymer crosslinking. In yet another of its aspects this invention relates to the treatment of compositions capable of producing gels at a slow rate to increase the rate of gel formation. In yet another aspect of the invention it relates to the treating of underground formations by the in situ forming of gels.

The formation of gels by the crosslinking of polymers is well known in the art. A great deal of literature has been generated concerning the formation of gels in situ in underground formations for the purpose of treating the formations better to produce oil and gas from bore holes drilled into the formations. It is well recognized that processes that will facilitate the plugging of underground formations in desired areas, particularly the most permeable portions of the formations, are advantageous in the production of oil and gas. I have now discovered gel forming compositions that, because of the slow rate of gel formation, can advantageously be used to penetrate porous formations before thickening sufficiently to cause difficulty in injecting the compositions into an underground formation to be treated.

It is therefore an object of this invention to provide compositions that form gels at a slow rate. It is another object of this invention to provide a method for treating both injection wells and producing wells using these compositions. It is still another object of this invention to provide a method for increasing the rate of gel formation of compositions that normally form gels by crosslinking at a slow rate.

Other aspects, objects, and the various advantages of this invention will become apparent upon reading this specification and the appended claims.

STATEMENT OF THE INVENTION

According to this invention, there are provided compositions capable of forming aqueous gels at a slow rate. These compositions comprise water, polymer capable of being crosslinked by polyvalent metal cations, and a redox system for effecting the crosslinking process with the redox system comprising an oxidizing agent such as dichromate or permanganate and a reducing agent selected from among KI, $MnCl_2$, $Mn(NO_3)_2$, and $K_4Fe(CN)_6$.

The invention can also be described as a discovery that using certain compounds, namely, KI, $MnCl_2$, $Mn(NO_3)_2$, or $K_4Fe(CN)_6$ as the reducing agent in a redox system for generating the polyvalent metal cations for crosslinking polymers in aqueous solution results in slow gelation of the polymer solution.

In one embodiment of the invention, these polymeric compositions are injected into an underground formation for the in situ gelation of polymer solution thereby at least partially blocking porous portions of the underground formation.

In another embodiment of the invention, the pH of the water solution capable of forming a gel by crosslinking is decreased thereby reducing the time taken for forming a gel or, stated another way, increasing the rate of gel formation of the composition.

The polymeric materials which are suitable for use in the practice of the invention include at least one chemically crosslinkable, at least water-dispersible polymer selected from the group consisting of polyacrylamides and related polymers, cellulose ethers, and polysaccharides which can be crosslinked or gelled in an aqueous medium with the polyvalent metal cations described herein. Where used, in the specification and in the claims, unless otherwise specified, the term "polymer" is employed generically to include both homopolymers and copolymers, and the term "water-dispersible polymers" is employed to include those polymers which are truly water-soluble and those which are dispersible in water or other aqueous medium to form stable colloidal suspensions which can be crosslinked as described herein.

The polyacrylamides and related polymers which can be employed in the practice of the present invention include at least one crosslinkable, at least water-dispersible polymer which can be used in an aqueous medium with the gelling agents hereinafter described to give an aqueous gel, said polymers being selected from the group consisting of: polyacrylamides and polymethacrylamides wherein up to about 75 percent of the carboxamide groups can be hydrolyzed to carboxyl groups; crosslinked polyacrylamides and crosslinked polymethacrylamides wherein up to about 75 percent of the carboxamide groups can be hydrolyzed to carboxyl groups; polyacrylic acid and polymethacrylic acid; polyacrylates, polymers of N-substituted acrylamides wherein the nitrogen atoms in the carboxamide groups can have from 1 to 2 alkyl substituents which contain from one to four carbon atoms; copolymers of acrylamide with another ethylenically unsaturated monomer copolymerizable therewith, sufficient acrylamide being present in the monomer mixture to impart said water-dispersible properties to the resulting copolymer when it is mixed with water, and wherein up to about 75 percent of the carboxamide groups can be hydrolyzed to carboxyl groups; and admixtures of such polymers. Presently preferred polyacrylamide-type polymers include the various substantially linear homopolymers and copolymers of acrylamide and methacrylamide. By substantially linear it is meant that the polymers are substantially free of crosslinking between the polymer chains. Said polymers can have up to about 75, preferably up to about 45, percent of the carboxamide groups hydrolyzed to carboxyl groups. As used herein and in the claims, unless otherwise specified, the term "hydrolyzed" includes modified polymers wherein the carboxyl groups are in the acid form and also such polymers wherein the carboxyl groups are in the salt form, providing said salts are at least water-dispersible. Such salts include the ammonium salts, the alkali metal salts, and others which are at least water-dispersible. Hydrolysis can be carried out in any suitable fashion, for example, by heating an aqueous solution of the polymer with a suitable amount of sodium hydroxide.

Substantially linear polyacrylamides can be prepared by methods known in the art. For example, the polymerization can be carried out in aqueous mediums, in the presence of a small but effective amount of a water-soluble oxygen-containing catalyst, e.g. a thiosulfate or bisulfate of potassium or sodium hydroperoxide at a temperature between about 30° and 80° C. The resulting polymer is recovered from the aqueous medium, as by drum drying, and can be subsequently ground to the desired particle size. A presently preferred particle size is such that about 90 weight percent will pass through a No. 10 mesh sleeve, and not more than about 10 weight percent will be retained on a No. 200 mesh sieve (U.S. Bureau of Standards Sieve Series).

Included among the copolymers which can be used in the practice of the invention are the at least water-dispersible copolymers resulting from the polymerization of the major proportion of acrylamide or methacrylamide and a minor proportion of an ethylenically unsaturated monomer copolymerizable therewith. It is desirable that sufficient acrylamide or methacrylamide be present in the monomer mixture to impart to the copolymer the above-described water-dispersible properties, for example, from about 90 to about 99 percent acrylamide and from about 1 to 10 percent other ethylenically unsaturated monomers. Such monomers include acrylic acid, methacrylic acid, vinyl sulfonic acid, vinyl benzyl sulfonic acid, vinyl benzene sulfonic acid, vinyl acetate, acrylonitrile, methylacrylonitrile, vinyl ether, vinyl chloride, maleic anhydride, and the like. Various methods are known in the art for preparing such copolymers, e.g., see U.S. Pat. Nos. 2,625,529; 2,740,522, 2,729,557, 2,831,841; and 2,909,508. Such copolymers can be used in the hydrolyzed form, as discussed above for the homopolymers.

Polyacrylic acids, including polymethacrylic acid, prepared by methods known in the art can also be used in the practice of the invention.

Polymers of N-alkyl-substituted acrylamides wherein the nitrogen atoms and the carboxamide groups can have from 1 to 2 alkyl substituents which contain from one to four carbon atoms can also be used in the practice of the invention. Examples of such N-substituted acrylamides include, among other, N-methylacrylamide, N-propylacrylamide, N-butylacrylamide, N,N-dimethylacrylamide, N-methyl-N-sec-butylacrylamide, and the like, at various stages of hydrolysis, as described above.

Crosslinked polyacrylamides and crosslinked polymethacrylamides at various stages of hydrolysis as described above can also be used in the practice of the invention. In general, said crosslinked polyacrylamides can be prepared by the methods described above but including in a monomeric mixture a suitable amount of a suitable crosslinking agent. Examples of crosslinking agents include methylenebisacrylamide, divinylbenzene, divinylether, and the like. Said crosslinking agents can be used in small amounts, e.g., up to about 1 percent by weight of the monomeric mixture. Such crosslinking is to be distinguished from any crosslinking which occurs when solutions of polymers are gelled as described herein. Mixtures of the above-described polymers can also be used in the practice of the invention.

Representative cellulose ethers which can be used in the practice of the present invention include, inter alia, the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose and hydroxypropyl cellulose; alkylhydroxyalkyl celluloses such as methylhydroxypropyl cellulose; alkylcarboxyalkyl celluloses such as ethylcarboxymethyl cellulose, and hydroxyalkylalkyl celluloses such as hydroxypropylmethyl cellulose, and the like. Many of said cellulose ethers are available commercially in various grades. The carboxy-substituted cellulose ethers are available as the alkali metal salt usually the sodium salts. However, the metal is seldom referred to and they are commonly referred to as CMC, CMHEC for carboxymethylhydroxyethyl cellulose, etc. For example, water-soluble CMC is available in various degrees of carboxylate substitution ranging from about 0.3 up to the maximum degree of substitution of 3.0. In general, CMC having a degree of substitution in the range of 0.65 to 0.95 is preferred. Frequently, CMC having a degree of substitution in the range of 0.85 to 0.95 is a more preferred cellulose ether. CMC having a degree of substitution less than the above-preferred ranges is usually less uniform in properties and thus less desirable. CMC having a degree of substitution greater than the above-preferred ranges usually has a lower viscosity and more is required in preparing suitable aqueous compositions. Said degree of substitution of CMC is commonly designated in practice as CMC-7, CMC-9, CMC-12, etc., wherein the 7, 9, and 12 refer to a degree of substitution of 0.7, 0.9, and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 4 or higher.

The amount of cellulose ether used in preparing the aqueous compositions used in the practice of the invention can vary widely depending upon the viscosity, grade and purity of the ether and properties desired in the aqueous compositions of the invention. In general, the amount of cellulose ether used will be at least a water-thickening amount, i.e., at least an amount which will significantly thicken the water to which it is added. For example, amounts on the order of 25 to 100 parts per million by weight (0.0025 to 0.01 weight percent) have been found to significantly thicken water. Water containing 25 ppm of CMC has a viscosity increase of about 21 percent. At 50 ppm the viscosity increase is about 45 percent. At 100 ppm the viscosity increase is about 195 percent. Generally speaking, amounts in the range of from about 0.0025 to about 5.0, preferably from about 0.01 to about 1.5, weight percent, based on the weight of water, can be used as thickening amounts. Amounts outside these ranges can also be used. Amounts within said preferred ranges described herein are the more dilute or more concentrated compositions which can be prepared. Amounts of cellulose ether within the above ranges provide aqueous compositions which develop good gel strength when crosslinked in situ within the formation.

Representative of the polysaccharides which can be used in forming the polymeric compositions of this invention are the heteropolysaccharides produced by fermentation of carbohydrates by bacteria of the genus Xanthomonas. Exemplary of such heteropolysaccharides are those produced by Xanthomonas campestris, Xanthomonas begonia, Xanthomonas phaseoli, Xanthomonas hederae, Xanthomonas incanae, Xanthomonas carotae, and Xanthomonas translucene. Of these, ionic polysaccharide B-1459 is preferred. The polysaccharide B-1459 is prepared by culturing the bacterium Xanthomonas campestris NRRL, B-1459, United States Department of Agriculture, on a well-aerated medium containing commercial glucose, organic nitrogen sources, dipotassium hydrogen phosphate, and various trace elements. Fermentation is carried out to completion in 4 days or less at a pH of about 7 and a temperature of 28° C. Polysaccharide B-1459 is commercially available under the trade name of "Kelzan" from the Kelco Company, San Diego, Calif.

All the polymers useful in the practice of the invention are characterized by high molecular weight. The molecular weight is not critical so long as the polymer has the above-described at least water-dispersible properties. It is preferred that the polymer have a molecular weight of at least 100,000. The upper limit of molecular weight is unimportant so long as the polymer is at least water-dispersible. Thus, polymers having molecular weights as high as 20,000,000 or higher, and meeting said conditions, can be used.

The amount of such polymers used in the practice of the invention can vary widely depending upon the particular polymer used, the purity of said polymer and properties desired in the resulting aqueous crosslinked compositions. In general, the amount of polymer used in preparing the aqueous compositions will be a water-thickening amount, i.e., at least an amount which will significantly thicken the water to which it is added. Generally speaking, amounts in the range of 0.0025 to 5, preferably 0.01 to 1.5, weight percent, based upon the weight of the aqueous medium, can be used in the practice of the invention. However, amounts outside these ranges can be employed.

The reducible component of the redox systems containing polyvalent metal in an elevated oxidation state which are used in the practice of the invention are water-soluble compounds containing said polyvalent metals wherein the polyvalent metal is generally present in its highest valence state. Examples of such compounds include potassium permanganate, sodium permanganate, ammonium dichromate, the alkali metal chromates and dichromates, and chromium trioxide. Sodium dichromate and potassium dichromate, because of low cost and ready availability are the presently preferred reducible components for use in the redox systems of the present invention. The hexavalent chromium in the chromium compounds is reduced in situ to trivalent chromium by suitable reducing agents, as discussed hereinafter. In the permanganate compounds the manganese is reduced from +7 valence to +4 valence. At present the preferred oxidizing compound is $Na_2Cr_2O_7$.

The amount of reducible (oxidizing) component used in the practice of the invention will be a sensible amount, i.e., a small but finite amount which is more than incidental impurities, but which is effective or sufficient to cause subsequent gellation when the metal in the oxidizing component is reduced to a lower polyvalent valence state. The lower limit of the concentration of the starting oxidizing component will depend upon several factors including the particular type of polymer or mixture of polymers used. The concentration of the crosslinkable polymer or polymers in the water, the water which is used, and the type of crosslinked product desired. Also, the fraction of polymer which is desired to be crosslinked can control the amount of oxidizing component. For similar reasons, the upper limit on the concentration of the oxidizing component of the redox systems also cannot always be defined. However, as a general guide, the amount of the starting oxidizing components used in preparing the crosslinked compositions in accordance with the invention will be in the range of from 0.05 to 75, preferably 0.5 to 40, weight percent of the amount of polymer used.

However, in some situations, it may be desirable to use amounts of starting polyvalent metal-containing oxidizing components which are outside the above ranges. Such use is within the scope of the invention. Those skilled in the art can determine the amount of starting polyvalent metal-containing oxidizing agent to be used by simple experiments carried out in the light of this disclosure. For example, when brines, such as are commonly available in producing oil fields, are used in the water for preparing gels for use in the practice of the invention, less of the starting polyvalent metal-containing oxidizing compound is required than when distilled water is used. Stable gels have been prepared using brines having a wide range of dissolved solid content, e.g., from 850, 1,200, 6,000, and 100,000 ppm total dissolved solids, depending upon the particular polymer and brine used. Gellation rates are frequently faster when using oil field brines. Such oil field brines commonly contain varying amounts of sodium chloride, calcium chloride, magnesium chloride, etc. Sodium chloride is usually present in the greatest concentration. The word "water" is used generically herein and in the claims, unless otherwise stated, to include such brines, fresh water, and other aqueous media which can be gelled in accordance with the invention.

I have found that suitable agents for use as the reducing component in the practice of the present invention include $MnCl_2$, KI, $K_4Fe(CN)_6$, and $Mn(NO_3)_2$. These compounds, as will be exhibited below, all cause polymer crosslinking at a slower rate than reducing agents hitherto commonly used such as sodum sulfite, sodium hydrosulfite, sodium metabisulfite, and other sulfur containing compounds which cause the setting of gels within a relatively short time, usually in a period of 15 minutes to 12 hours. Using the reducing agents of the present invention, gel set times can range from about 2 days to about 10 days or even more.

The amount of reducing agent to be used in the practice of the invention will also be a sensible amount, i.e., a small but finite amount which is more than incidental impurities, but which is effective or sufficient to reduce at least a portion of the higher valence metal in the starting components to a lower polyvalent valence state. Thus, the amount of reducing agent to be used depends, to some extent at least, upon the amount of the reducible polyvalent metal-containing component which is used. In many instances, it will be preferred to use an excess of reducing agent to compensate for dissolved oxygen in the water, exposure to air during preparation of the compositions, and possible contact with other oxidizing substances such as might be encountered in field operations. As a general guide, the amount of reducing agent used will generally be within the range of from 0.1 to at least 300, preferably at least about 200, weight percent of the stoichiometric amount required to reduce the metal in the starting polyvalent metal component to said lower polyvalent valence state, e.g., +6 chromium to +3 chromium. However, in some instances, it may be desirable to use amounts of reducing agent outside said ranges. The use of such ranges is within the scope of the invention. Those skilled in the art can determine the amount of reducing agent to be used by simple experiments carried out in the light of this disclosure.

It has also been discovered that by decreasing the pH in the aqueous polymeric solution of this invention that the rate of gel formation can be substantially increased. The pH is easily increased by the addition of an acid such as HCL, acetic acid, or sulfuric. The amount of acid added is dependent upon the increase of rate of gelation desired. A decrease in the pH level will increase the rate of gel formation. For example, the addition of sufficient acid to lower the pH into the range of 4 to 6 is desirable.

General methods for treating underground formations with compositions that will form gels by crosslinking are well known in the art. The improvement of using compositions in this invention or of using compositions containing the reducing agents of this invention result in the ability to circulate compositions above ground sufficiently to insure excellent mixing of the components and the ability to penetrate into the smallest pore areas of the formation before the viscosity of the solutions increase sufficiently to cause difficulty in the injection of material into the wells. The compositions of this invention are suitable for any of the standard formation treatments known in the art and use with the equipment that is generally well known in the art.

The compositions of this invention and the improved performance resulting therefrom are shown in the following examples which are illustrations and are not intended as limitations of the scope of the appended claims.

EXAMPLE I

A 5,000 ppm aqueous solution of CMC 9H, which is a commercially available carboxymethylcellulose was prepared by dissolving the CMC 9H in tap water. To this solution was added 1,250 ppm of $Na_2Cr_2O_7.2H_2O$. Selected amounts of various reducing agents as shown in the Table below were added with mixing to provide solutions. The solutions were placed in separate 4 oz. vials with each sealed vial containing a 0.375 in. diameter steel ball weighing 3.52 grams. The vials were observed at intervals and the gel set time was recorded as the time at which the gelled system had thickened to the point that the ball was suspended in the gel. The results of these tests are recorded in Table I.

TABLE I

| Reducing Agent | Amount Reducing Agent | Gel Set Time |
|---|---|---|
| $Na_2S_2O_5$ | 1250 PPM | 25 min. |
| $NaHSO_3$ | 1250 PPM | 26 min. |
| $C_6H_4(OH)_2$ | 1250 PPM | 31 min. |
| $Na_2S_2O_4$ | 1250 PPM | 60 min. |
| $Na_2SO_3$ | 1250 PPM | 5 hrs. 31 min. |
| $MnCl_2$ | 6000 PPM | 2 days 5 hrs 35 min. |
| KI | 6000 PPM | 10 days |

The Table above shows that the reducing agents used in the compositions of the present invention, e.g., $MnCl_2$ and KI, provided longer gel set times than did the reducing agents commonly used.

EXAMPLE II

In a manner similar to Example I, two 200 cc samples were prepared containing 5,000 parts per million CMC9H, 0.5 gm KI, and 0.5 gm $Na_2Cr_2O_7.2H_2O$. To one of these samples was added 15 drops of 15% HCl. The solution to which the HCl was added gelled overnight. The identical thickened solution minus the HCl had not gelled after 7 days.

This Example illustrates that the rate of gelation using the reducing agents of the present invention can be increased by decreasing the pH.

EXAMPLE III

In a manner similar to that of Example I, several additional polymer solutions containing 5000 ppm CMC polymer and 2500 ppm $Na_2Cr_2O_7.2H_2O$ were prepared. Several different reducing agents were then added and the solution mixtures were allowed to stand. Periodically, the solution mixtures were visually observed for the onset of gelation. The results of these tests are shown below in Table II.

TABLE II

| Reducing Agent | Amount Reducing Agent | Gel Set Time |
|---|---|---|
| $Mn(NO_3)_2$ | 1500 ppm | Slight increase in viscosity after 5 days |
| KI | 2000 ppm | 6 days |
| $K_4Fe(CN)_6$ | 2500 ppm | 5 days |

The data in Table II show that $Mn(NO_3)_2$ and $K_4Fe(CN)_6$ are also effective as slow acting reducing agents which can delay the onset of gelation. The KI reducing agent is again shown to be effective at still another concentration.

EXAMPLE IV (Calculated)

In a 3000 foot deep injection well in the North Burbank Unit, Shidler, Oklahoma, it is desired to improve the water injection profile by treating the well with the present inventive process. The well is taking 1000 barrels of water per day at 100 psi. The present inventive process is used to treat a 15 foot thick sandstone interval at 1600 feet which has a 5 foot thick streak taking 400 barrels of water per day and a ten foot thick streak taking 200 barrels of water per day.

A fresh water solution of carboxymethyl cellulose (CMC) and sodium dichromate ($Na_2Cr_2O_7$) is prepared by dissolving 1000 pounds of CMC and 333 pounds $Na_2Cr_2O_7$ in sufficient water to make about 1000 barrels of solution. A 333 pound portion of potassium iodide (KI) is blended into the $CMC-Na_2Cr_2O_7$ solution and this solution is injected into the well at 0.5 barrel per minute at a non-fracturing pressure of less than 600 psi. After all of the $CMC-Na_2Cr_2O_7-KI$ solution is injected, the polymer-containing solution is flushed with fresh water and the well is shut in for a period of 2-3 weeks.

On re-opening the injection well, another water injection profile is determined which shows that after treatment the five foot thick streak is taking only 200 barrels of water per day and the ten foot thick streak is taking only 100 barrels of water per day. Thus, after the treatment with the inventive process, the less permeable oil rich zones in the formation are taking a greater percentage of the injected water resulting in an ultimate improvement in sweep efficiency reflected in a decreased water/oil ratio at an off-set producing well after a period of 3 months.

The effectiveness of the slow gelling inventive polymer solution in diminishing the permeability of the 5 foot streak and 10 foot streak is evident in the following tabulation.

|  | Pre-treatment | Post treatment |
| --- | --- | --- |
| 5 foot thick streak | 400 bbls of H$_2$O/day | 200 bbls of H$_2$O/day |
| 10 foot thick streak | 200 bbls of H$_2$O/day | 100 bbls of H$_2$O/day |

EXAMPLE V (Calculated)

In a 3500 foot deep producing well in the North Burbank Unit, it is desired to decrease the water-to-oil ratio by treating the well with the present inventive process. Before treatment the well is producing 50 barrels of water per day for each barrel of oil and the total fluid flow from the well is 1020 barrels per day. A water entry survey of the producing well shows a 25 foot thick sandstone interval at 2000 feet which has a 10 foot thick streak producing 400 barrels of fluid per day and a 15 foot thick streak producing 200 barrels of fluid per day.

A fresh water solution of CMC-Na$_2$Cr$_2$O$_7$-KI is prepared as described in Example III and injected into the producing well at 0.5 barrel per minute at a non-fracturing pressure of less than 600 psi. After all of the CMC-Na$_2$Cr$_2$O$_7$-KI solution is injected, the polymer-containing solution is flushed with fresh water and the well is shut in for a period of 2–3 weeks.

On returning the well to production, the well is producing 800 barrels of water per day and another water entry survey is run which shows that after treatment the 10 foot thick streak is producing 200 barrels of fluid per day and the 15 foot thick streak is producing 100 barrels of fluid per day. Within two weeks after treatment of the producing well with the inventive process, the water-to-oil ratio is dramatically decreased to 20 barrels of water per barrel of oil.

The effectiveness of the slow gelling inventive polymer solution in improving the water-to-oil ratio and decreasing the permeability of the 10 foot thick and 15 foot thick streaks is evident in the following tabulation.

|  | Pre-treatment | Post-treatment |
| --- | --- | --- |
| Bbls of water/day | 1000 | 800 |
| Bbls of oil/day | 20 | 40 |
| 10 foot thick streak | 400 bbls fluid/day | 200 bbls fluid/day |
| 15 foot thick streak | 200 bbls fluid/day | 100 bbls fluid/day |

EXAMPLE VI (Calculated)

In a 3000 foot deep injection well in the North Burbank Unit, it is desired to improve the water injection profile by treating the well with the present inventive process using an acidified gelling solution. The well is taking 3000 barrels of water per day at 150 psi. A water injection survey shows that a 10 foot thick interval at 1200 feet has a 2 foot streak taking 800 barrels of water per day and an 8 foot streak taking 400 barrels of water per day.

A fresh water solution of carboxymethyl cellulose (CMC) and sodium dichromate (Na$_2$Cr$_2$O$_7$) is prepared by dissolving 1000 pounds of CMC and 666 pounds Na$_2$Cr$_2$O$_7$ in sufficient water to make about 1000 barrels of solution. A 666 pound portion of potassium iodide (KI) is blended into the CMC-Na$_2$Cr$_2$O$_7$ solution and sufficient 15 weight percent aqueous hydrochloric acid is blended into this solution to adjust the pH to about 5. This acidified solution is injected into the well at 0.5 barrel per minute at a non-fracturing pressure of less than 600 psi. After all of the acidified CMC-Na$_2$Cr$_2$O$_7$-KI solution is injected, the polymer-containing solution is flushed with fresh water and the well is shut in for a period of 2–3 days.

On re-opening the injection well, it is found that the well is taking 1000 barrels of water per day at 150 psi. After treatment with the acidified polymer solution, another water injection profile is determined which shows that the 2 foot streak is taking 200 barrels of water per day and the 8 foot streak is taking 100 barrels of water per day.

The effectiveness of the acidified inventive polymer solution in diminishing the permeability of the 2 foot streak and the 8 foot streak is evident in the following tabulation.

|  | Pre-treatment | Post-treatment |
| --- | --- | --- |
| 2 foot thick streak | 800 bbls H$_2$O/day | 200 bbls H$_2$O/day |
| 8 foot thick streak | 400 bbls H$_2$O/day | 100 bbls H$_2$O/day |

EXAMPLE VII (Calculated)

In a 3200 foot deep producing well in the North Burbank Unit, it is desired to improve the water-to-oil ratio by treating the well with an acidified solution of carboxymethyl cellulose (CMC), sodium dichromate (Na$_2$Cr$_2$O$_7$) and potassium iodide (KI) in accordance with the present invention. Before treatment the well is producing 3000 barrels of water per day and 75 barrels of water for each barrel of oil. A water entry survey of the producing well shows a 20 foot thick sandstone interval at 2400 feet which has a 15 foot thick streak producing 600 barrels of fluid per day and a 5 foot thick streak producing 200 barrels of fluid per day.

An acidified aqueous solution of CMC-Na$_2$Cr$_2$O$_7$-KI is prepared as described in Example V and injected into the producing well at 0.5 barrel per minute at a non-fracturing pressure of less than 600 psi. After all of the acidified CMC-Na$_2$Cr$_2$O$_7$-KI solution is injected, the polymer-containing solution is flushed with fresh water and the well is shut in for a period of 2–3 days.

On returning the well to production, the well is producing 1000 barrels of water per day and another water entry survey is run which shows that after treatment the 15 foot thick streak is producing 300 barrels of fluid per day and the 5 foot thick streak is producing 50 barrels of fluid per day. Within a week after treatment of the producing well with the acidified polymer solution, the water-to-oil ratio is decreased to 20 barrels of water per barrel of oil.

The effectiveness of the acidified polymer gelling solution in improving the water-to-oil ratio and decreasing the permeability of the 15 foot thick and 5 foot thick streaks is evident in the following tabulation.

|  | Pre-treatment | Post-treatment |
| --- | --- | --- |
| Bbls of H$_2$O/day | 3000 | 1000 |
| Bbls of oil/day | 40 | 50 |
| 15 foot thick streak | 600 bbls fluid/day | 300 bbls fluid/day |
| 5 foot thick streak | 200 bbls fluid/day | 50 bbls fluid/day |

I claim:

1. A composition capable of forming a gel for treating underground formations at a slow rate of gelling by crosslinking, said composition consisting essentially of gel forming amounts of:
   a. water;
   b. a water thickening amount of a water dispersible polymer selected from among the group consisting of substantially linear homopolymers and copolymers of acrylamide and methacrylamide, cellulose ethers, and heteropolysaccharides produced by fermentation of carbohydrates by bacteria of the genus Xanthomonas, said polymer capable of being crosslinked by polyvalent metal cations;
   c. a polyvalent metal component chosen from the group consisting of hexavalent chromium compounds and heptavalent manganese compounds in a reducible oxidation state; and
   d. a reducing agent selected from among the group consisting of $MnCl_2$, KI, $K_4Fe(CN)_6$ and $Mn(NO_3)_2$.

2. The composition of claim 1 wherein the reducing agent is KI.

3. The composition of claim 1 wherein the reducing agent is $MnCl_2$.

4. The composition of claim 1 wherein the reducing agent is $Mn(NO_3)_2$.

5. The composition of claim 1 wherein the reducing agent is $K_4Fe(CN)_6$.

6. A composition according to claim 1 further containing a compound that will affect the pH of the composition, said compound present in sufficient amount to obtain a pH of the total composition within the range of about 4 to about 6.

7. A composition of claim 1 in which the amount of polyvalent metal-containing oxidizing component is in the range of from about 0.05 to about 75 weight percent of the amount of polymer used.

8. A method for forming a gel for treating underground formations, said gel capable of gelling at a slow rate, comprising contacting a solution consisting essentially of a gel forming amount of water, and a water thickening amount of a water dispersible polymer selected from among the group consisting of substantially linear homopolymers and copolymers of acrylamide and methacrylamide, cellulose ethers, and heteropolysaccharides produced by fermentation of carbohydrates by bacteria of the genus Xanthomonas, said polymer capable of being crosslinked by polyvalent metal cations with an amount of a redox system capable of initiating gelling, said redox system consisting essentially of a reducible polyvalent metal component chosen from the group consisting of hexavalent chromium compounds and heptavalent manganese compounds and a reducing agent selected from the group consisting of $MnCl_2$, KI, $Mn(NO_3)_2$, and $K_4Fe(CN)_6$.

9. A method of claim 8 in which the amount of polyvalent metal-containing oxidizing component is in the range of from about 0.05 to about 75 weight percent of the amount of polymer used.

10. A method for at least partially plugging porous portions of an underground formation comprising injecting into said formation a composition of claim 1 and allowing said composition to produce a gel.

* * * * *